J. SHEPARD & B. B. LEWIS.

Assignors, by mesne assignments, to J. SHEPARD.

Fruit-Boxes.

No. 7,987. Reissued Dec. 11, 1877.

Witnesses.
H. B. Thomson.
W. C. Humason Jr.

Inventors.
James Shepard
Benjamin B. Lewis
By James Shepard atty.

UNITED STATES PATENT OFFICE.

JAMES SHEPARD, OF NEW BRITAIN, AND BENJAMIN B. LEWIS, OF BRISTOL, CONN., ASSIGNORS, BY MESNE ASSIGNMENTS, TO JAMES SHEPARD.

IMPROVEMENT IN FRUIT-BOXES.

Specification forming part of Letters Patent No. 54,614, dated May 8, 1866; Reissue No. 7,987, dated December 11, 1877; application filed October 25, 1877.

*To all whom it may concern:*

Be it known that we, JAMES SHEPARD, formerly of Bristol, in the county of Hartford and State of Connecticut, now of New Britain, said county and State, and BENJAMIN B. LEWIS, of Bristol, aforesaid, have invented certain new and useful Improvements in Making Boxes for Fruit and other articles, of which the following is a specification:

Our invention relates to the art of constructing boxes for fruit and other articles from thin wood or veneer; and consists in constructing the same from a single thickness of veneer, by bending the wood obliquely with the grain, as hereinafter described.

Figure 1:
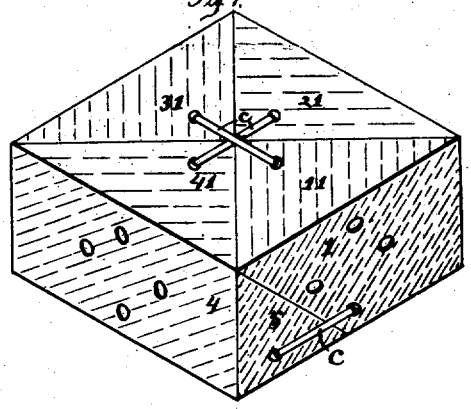
Figure 2:
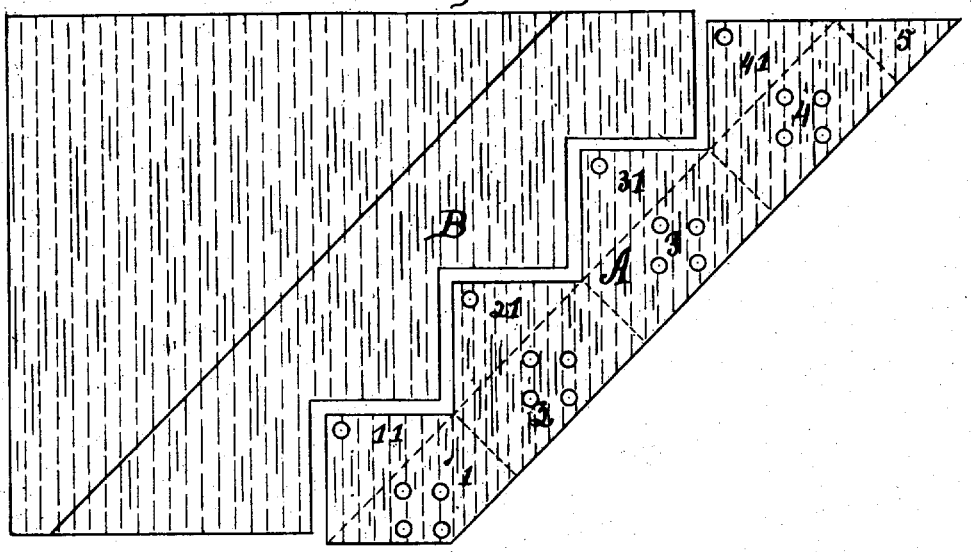

In the accompanying drawings, Figure 1 is a perspective view of a box which embodies our invention, the same being represented bottom side up; and Fig. 2 is a plan view of a blank for a box which embodies our invention, showing also the sheet of veneer from which the blank was cut.

A, Fig. 2, designates a finished blank, and B an unfinished one, the same showing how one blank matches into another one, so that there is no waste of stock in cutting a blank of this shape from a continuous strip of the proper width.

The broken lines in Fig. 2 indicate a shallow cut or crease on the lines where the box is to be bent into abrupt angular bends, as shown in Fig. 1. The fine lines covering the ground of both figures indicate the direction of the grain of the wood, and by reference to Fig. 2 it will be seen that the lines for these angular bends run in a direction obliquely with the grain of the wood, and therefore across the grain, part of which lines are parallel with the length of the blank, and part at right angles to it, so that said lines on forming angular bends are not parallel to each other, by which means two non-parallel bends can be made in the same piece of veneer without having either abrupt angular bend run parallel with the grain of the veneer, which, therefore, will not be liable to split off in the act of bending.

Small holes are made in the veneer, part of which are for ventilation, and part are to receive the fasteners or clasps *c*, which form a cheap means of securing the box together.

1, 2, 3, 4, and 5 designate the sides and parts of a side, and 11, 21, 31, and 41 designate the quarters of the bottom. The blank is bent with an abrupt angular bend at each of the four transverse broken lines shown in Fig. 2. When the part of a side, 5, meets the part of a side, 1, the two together complete one side of the box, as shown in Fig. 1. The points or quarters 11, 21, 31, and 41 are then bent inward to form the bottom, and the whole secured in place, as shown in Fig. 1, when the box is complete.

These boxes can be varied in shape without materially altering the shape of the blank.

By our improvement we are enabled to make a box of a single piece of veneer, having abrupt angular bends on non-parallel lines, so that both of said bends run in a direction to cross the grain of the wood, and at neither of them will the veneer be liable to split off in the act of bending.

We claim as our invention—

In the art of constructing boxes for fruit and other articles from blanks of a single thickness, bending the blank obliquely with the grain of thin wood or veneer, substantially as and for the purpose herein specified.

JAMES SHEPARD.
BENJAMIN B. LEWIS.

Witnesses:
GEO. A. GOWDY,
GILBERT PENFIELD.